US009946773B2

United States Patent
Mohsin et al.

(10) Patent No.: US 9,946,773 B2
(45) Date of Patent: *Apr. 17, 2018

(54) GRAPHICAL KEYBOARD WITH INTEGRATED SEARCH FEATURES

(71) Applicant: Google Inc., Mountain View, CA (US)

(72) Inventors: Muhammad Mohsin, Santa Clara, CA (US); Pranay Gupta, San Francisco, CA (US); Michael Burks, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,409

(22) Filed: Oct. 24, 2016

(65) Prior Publication Data

US 2017/0308591 A1    Oct. 26, 2017

Related U.S. Application Data

(63) Continuation of application No. 15/134,243, filed on Apr. 20, 2016.

(51) Int. Cl.
   *G06F 17/30* (2006.01)
   *G06F 3/0488* (2013.01)
   (Continued)

(52) U.S. Cl.
   CPC ...... *G06F 17/30554* (2013.01); *G06F 3/0482* (2013.01); *G06F 3/04842* (2013.01);
   (Continued)

(58) Field of Classification Search
   None
   See application file for complete search history.

(56) References Cited

U.S. PATENT DOCUMENTS 6,104,397 A    8/2000   Ryan et al.
8,484,573 B1   7/2013   Zhai et al.
(Continued)

FOREIGN PATENT DOCUMENTS

EP    2940605 A1    11/2015

OTHER PUBLICATIONS https://blogs.microsoft.com/firehose/2016/02/23/hub-keyboard-app-from-microsoft-garage-makes-it-easy-to-multitask-from-one-mobile-screen/#sm.0003gjoqg1af9fnhzei1w2hq0ii8r (MS Hub)—Disclosed in Applicant's IDS.*

(Continued)

*Primary Examiner* — Kevin L Young
*Assistant Examiner* — FJ Farhadian
(74) *Attorney, Agent, or Firm* — Shumaker & Sieffert, P.A.

(57) ABSTRACT

A computing device may include a presence-sensitive display, at least one processor, and a memory storing instructions that, when executed by the at least one processor, cause the at least one processor to output, for display at the presence-sensitive display, a graphical keyboard including a plurality of keys and a suggestion region; determine, based on a selection of the suggestion region or one or more keys from the plurality of keys, a search query; retrieve one or more search results determined based on the search query; and output, in place of at least a portion of the graphical keyboard, a visual representation of a particular search result of the one or more search results.

10 Claims, 6 Drawing Sheets

(51) Int. Cl.
*G06F 3/0484* (2013.01)
*G06F 3/0482* (2013.01)
*G06F 17/24* (2006.01)
*G06T 13/80* (2011.01)

(52) U.S. Cl.
CPC ...... *G06F 3/04883* (2013.01); *G06F 3/04886* (2013.01); *G06F 17/24* (2013.01); *G06F 17/3056* (2013.01); *G06F 17/30477* (2013.01); *G06F 17/30864* (2013.01); *G06F 17/30973* (2013.01); *G06T 13/80* (2013.01)

(56) References Cited

U.S. PATENT DOCUMENTS

| | | | |
|---|---|---|---|
| 8,650,210 | B1 | 2/2014 | Cheng et al. |
| 8,706,750 | B2 | 4/2014 | Hansson et al. |
| 8,745,018 | B1* | 6/2014 | Singleton .......... G06F 17/30899 707/705 |
| 9,086,775 | B1 | 7/2015 | Tse et al. |
| 9,720,955 | B1 | 8/2017 | Cao et al. |
| 2006/0048076 | A1* | 3/2006 | Vronay .................. G06F 3/0482 715/850 |
| 2006/0294189 | A1 | 12/2006 | Natarajan et al. |
| 2007/0088686 | A1 | 4/2007 | Hurst-Hiller et al. |
| 2007/0130276 | A1 | 6/2007 | Zhang et al. |
| 2007/0300177 | A1 | 12/2007 | Karas et al. |
| 2008/0201434 | A1 | 8/2008 | Holmes et al. |
| 2011/0112824 | A1 | 5/2011 | Sayers et al. |
| 2011/0191321 | A1 | 8/2011 | Gade et al. |
| 2011/0191364 | A1 | 8/2011 | LeBeau et al. |
| 2011/0201387 | A1 | 8/2011 | Paek et al. |
| 2011/0221678 | A1* | 9/2011 | Davydov ............... G06F 3/0486 345/168 |
| 2012/0036469 | A1 | 2/2012 | Suraqui |
| 2012/0102549 | A1* | 4/2012 | Mazzaferri .......... G06F 21/6218 726/4 |
| 2012/0124071 | A1 | 5/2012 | Gebhard et al. |
| 2012/0124519 | A1 | 5/2012 | Uphoff et al. |
| 2012/0127083 | A1 | 5/2012 | Kushler et al. |
| 2012/0254227 | A1 | 10/2012 | Heck et al. |
| 2013/0120267 | A1 | 5/2013 | Pasquero et al. |
| 2013/0246913 | A1 | 9/2013 | McCormack et al. |
| 2013/0285913 | A1 | 10/2013 | Griffin et al. |
| 2013/0297317 | A1 | 11/2013 | Lee et al. |
| 2014/0002363 | A1 | 1/2014 | Griffin et al. |
| 2014/0115070 | A1 | 4/2014 | Virtanen et al. |
| 2014/0172814 | A1 | 6/2014 | Yuen et al. |
| 2014/0201676 | A1* | 7/2014 | Du ........................ G06F 3/0483 715/784 |
| 2014/0223372 | A1* | 8/2014 | Dostie .................. G06F 3/0482 715/813 |
| 2014/0229847 | A1 | 8/2014 | Park |
| 2014/0282136 | A1 | 9/2014 | Marantz et al. |
| 2014/0282203 | A1 | 9/2014 | Pasquero et al. |
| 2014/0330769 | A1 | 11/2014 | Nguyen et al. |
| 2014/0358940 | A1* | 12/2014 | Gupta ............... G06F 17/30389 707/748 |
| 2015/0006505 | A1 | 1/2015 | Plakhov et al. |
| 2015/0121286 | A1 | 4/2015 | Kim et al. |
| 2015/0201065 | A1* | 7/2015 | Shim ................. H04M 1/72569 455/556.1 |
| 2015/0242086 | A1* | 8/2015 | Mindlin ................ G06F 3/0481 715/769 |
| 2015/0317316 | A1 | 11/2015 | Ghanekar et al. |
| 2015/0331605 | A1 | 11/2015 | Park et al. |
| 2015/0370434 | A1 | 12/2015 | Kritt et al. |
| 2016/0006856 | A1* | 1/2016 | Bruno ............... H04M 1/72547 715/809 |
| 2016/0034977 | A1 | 2/2016 | Bhaowal et al. |
| 2016/0124926 | A1 | 5/2016 | Fallah |
| 2016/0330150 | A1* | 11/2016 | Joe ........................ H04L 51/046 |
| 2016/0334988 | A1 | 11/2016 | Kim et al. |
| 2017/0102870 | A1* | 4/2017 | Won ...................... G06F 3/0481 |
| 2017/0102871 | A1* | 4/2017 | Won ...................... G06F 3/0481 |
| 2017/0308273 | A1 | 10/2017 | Choi |
| 2017/0308291 | A1 | 10/2017 | Luipold |
| 2017/0308292 | A1 | 10/2017 | Choi |
| 2017/0308586 | A1 | 10/2017 | Mohsin et al. |
| 2017/0308587 | A1 | 10/2017 | Nagel et al. |
| 2017/0310616 | A1 | 10/2017 | Cao et al. |

OTHER PUBLICATIONS

MS Hub (Feb. 23, 2016): https://blogs.microsoft.com/firehose/2016/02/23/hub-keyboard-app-from-microsoft-garage-makes-it-easy-to-multitask-from-one-mobile-screen/#sm.0003gjoqg1af9fnhzei1w2hq0ii8r "Hub Keyboard, a Microsoft Garage Project" (p. 1).*
StackExchange (2013): https://ux.stackexchange.com/questions/40104/how-to-provide-autocomplete-and-autosuggest-on-the-same-search-box-at-the-same-t; "How to provide autocomplete and autosuggest on the same search box at the same time" (pp. 1-2).*
Chansanchai, "Hub Keyboard app from Microsoft Garage makes it easy to multitask from one mobile screen", retrieved from the Internet: <https://blogs.microsoft.com/firehose/2016/02/23/hub-keyboard-app-from-microsoft-garage-makes-it-easy-to-multitask-from-one-mobile-screen/#sm.0001ekq05s8cid6jpo52ovcbjyjie>, Feb. 23, 2016, 6 pp.
U.S. Appl. No. 15/383,753 by Alexa Greenberg et al., filed Dec. 19, 2016.
U.S. Appl. No. 15/332,513, by Heather Luipold, filed Oct. 24, 2016.
Whitwam, "Microsoft Hub Keyboard Comes to Android With All Things Microsoft in Tow", retrieved from http://www.androidpolice.com/2016/02/23/microsoft-hub-keyboard-comes-to-android-with-all-things-microsoft-in-tow/, Feb. 23, 2016, 5 pp.
Mcalone, "Slash is the best iPhone Keyboard—Business Insider," retrieved from http://www.businessinsider.com/slash-is-the-best-iphone-keyboard-2015-9, Sep. 22, 2015, 26 pp.
International Search Report and Written Opinion of International Application No. PCT/US2016/069170, dated Feb. 20, 2017, 12 pp.
U.S. Appl. No. 15/246,091, naming inventors Kong et al., filed Aug. 24, 2016.

* cited by examiner

GRAPHICAL KEYBOARD WITH INTEGRATED SEARCH FEATURES

RELATED APPLICATION

This application is a continuation of U.S. application Ser. No. 15/134,243, filed Apr. 20, 2016, the entire contents of which are hereby incorporated by reference.

BACKGROUND

Despite being able to simultaneously execute several applications, some computing devices can only present a graphical user interface (GUI) of a single application at a time. To interact with multiple applications at once, a user of a computing device may explicitly or implicitly instruct the computing device to switch between different application GUIs. For example, a user of a computing device may cease entering text in a messaging application and provide input to cause the device to switch to a search application to search for information, then switch back to the search application and enter further text regarding the searched-for information, resulting in an inelegant and inefficient user experience.

SUMMARY

In one example, a method includes outputting, by a computing device, for display, a graphical keyboard including a plurality of keys and a suggestion region. The method also may include determining, by the computing device, based on a selection of the suggestion region or one or more keys from the plurality of keys, a search query; and retrieving, by the computing device, one or more search results determined based on the search query; and outputting, by the computing device, in place of at least a portion of the graphical keyboard, a visual representation of a particular search result of the one or more search results.

In another example, a computing device includes a presence-sensitive display, at least one processor, and a memory storing instructions that, when executed by the at least one processor, cause the at least one processor to output, for display at the presence-sensitive display, a graphical keyboard including a plurality of keys and a suggestion region. The memory also stores instructions that, when executed by the at least one processor, cause the at least one processor to determine, based on a selection of the suggestion region or one or more keys from the plurality of keys, a search query; and retrieve one or more search results determined based on the search query; and output, in place of at least a portion of the graphical keyboard, a visual representation of a particular search result of the one or more search results.

In another example, a computer-readable storage medium encoded with instructions that, when executed by at least one processor of a computing device, cause the at least one processor to output, for display at a presence-sensitive display, a graphical keyboard comprising a plurality of keys and a suggestion region. The computer-readable storage medium is also encoded with instructions that, when executed by at least one processor of a computing device, cause the at least one processor to determine, based on a selection of the suggestion region or one or more keys from the plurality of keys, a search query; and retrieve one or more search results determined based on the search query; and output, in place of at least a portion of the graphical keyboard, a visual representation of a particular search result of the one or more search results.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques for enabling a computing device to output, for display, a visual representation of one or more search results within a graphical keyboard. By including the visual representation of the one or more search results within the graphical keyboard, the computing device may enable a user to perform a search query for desired information and view information received in response to the search query without switching between applications. In particular, the computing device may enable the user to input the search query and view the one or more search results within a graphical user interface that includes the graphical keyboard.

In some examples, the computing device may also determine, based on user input, selection of a portion of the visual representation of a particular search result of the one or more search results. In response, the computing device may be configured to, automatically, without further user input, insert information related to the search result in a text edit region displayed adjacent to the graphical keyboard. In this way, the computing device may enable insertion of information from the search result in the application for which the graphical keyboard is providing input. Further, by inserting the information from the search result in the text edit region with a single user input, the computing device may allow the user to input information with fewer inputs than a typical, multi-gesture, copy and paste action. In this way, the computing device described herein may enable information retrieval using a search query and insertion of the retrieved information in an application without application switching and with few user inputs.

Figure 1:
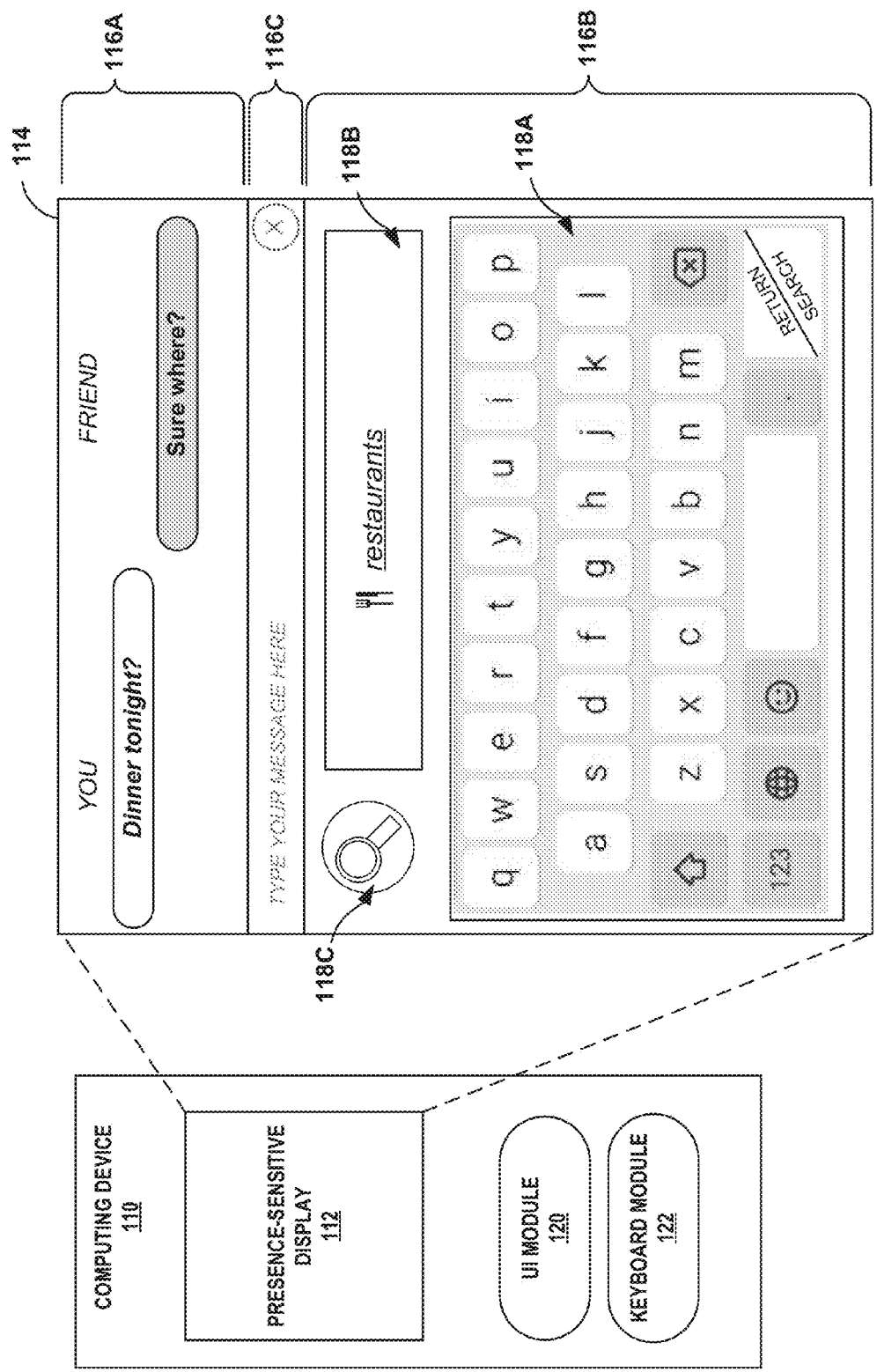
FIG. 1 is a conceptual diagram illustrating an example computing device that is configured to present a graphical keyboard with integrated search features, in accordance with one or more aspects of the present disclosure.

FIG. 1 is a conceptual diagram illustrating an example computing device 110 that is configured to output a graphical keyboard with integrated search features, in accordance with one or more aspects of the present disclosure. In some examples, computing device 110 may represent a mobile computing device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, kiosks, or any other types of wearable and non-wearable, mobile or non-mobile computing devices that may output a graphical keyboard for display.

Computing device 110 includes a presence-sensitive display (PSD) 112, a user interface (UI) module 120, and a keyboard module 122. Modules 120 and 122 may perform operations described using software, hardware, firmware, or a mixture of hardware, software, and firmware residing in and/or executing at computing device 110. For example, one or more processors of computing device 110 may execute instructions that are stored at a memory or other non-transitory storage medium of computing device 110 to perform the operations of modules 120 and 122. Computing device 110 may execute modules 120 and 122 as virtual machines executing on underlying hardware. As other examples, modules 120 and 122 may execute as one or more services of an operating system or computing platform, or modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as an input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of computing device 110. PSD 112 may detect input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interface 114 which, as shown in FIG. 1, is a graphical user interface of a chat application executing at computing device 110 and includes various graphical elements displayed at various locations of PSD 112.

Although shown in FIG. 1 as a chat user interface, user interface 114 may be any graphical user interface that includes a graphical keyboard with integrated search features. In the example of FIG. 1, user interface 114 includes an output region 116A, a graphical keyboard 116B, and a text edit region 116C. A user of computing device 110 may provide input at graphical keyboard 116B to produce textual characters within edit region 116C that form the content of the electronic messages displayed within output region 116A. The messages displayed within output region 116A form a chat conversation between a user of computing device 110 and a user of a different computing device.

UI module 120 manages user interactions with PSD 112 and other components of computing device 110. In other words, UI module 120 may act as an intermediary between various components of computing device 110 to make determinations based on user input detected by PSD 112 and generate output at PSD 112, e.g., in response to the user input. UI module 120 may receive instructions from an application, service, platform, or other module of computing device 110 to cause PSD 112 to output a user interface (e.g., user interface 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard having integrated search features. Keyboard module 122 may switch between operating in text-entry mode in which keyboard module 122 functions similar to a traditional graphical keyboard, or search mode in which keyboard module 122 performs various integrated search functions, including, for example, receiving search queries or outputting one or more search results for display instead of at least part of graphical keyboard 116B (e.g., one or more keys of plurality of graphical keys 118A).

In some examples, keyboard module 122 may be a stand-alone application, service, or module executing at computing device 110. In other examples, keyboard module 122 may be a sub-component of an application, service, or module executing at computing device 110. For example, keyboard module 122 may be integrated into a chat or messaging application executing at computing device 110. As another example, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be preloaded during production of computing device 110.

When operating in text-entry mode, keyboard module 122 of computing device 110 may perform traditional, graphical keyboard operations used for text-entry, such as: generating a graphical keyboard layout including plurality of graphical keys 118A for display at PSD 112, mapping detected inputs at PSD 112 to selections of graphical keys 118A, determining characters based on selected graphical keys 118A, and predicting or autocorrecting words and/or phrases based on the characters determined from selected graphical keys 118A.

Graphical keyboard 116B includes graphical elements displayed as graphical keys 118A. Keyboard module 122 may output information to UI module 120 that specifies the layout of graphical keyboard 116B within user interface 114.

For example, the information may include instructions that specify locations, sizes, colors, characters, and other characteristics of graphical keys 118A. Based on the information received from keyboard module 122, UI module 120 may cause PSD 112 display graphical keyboard 116B as part of user interface 114.

Each key of graphical keys 118A may be associated with a respective character (e.g., a letter, number, punctuation, or other character) displayed within the key. A user of computing device 110 may provide input at locations of PSD 112 at which one or more of graphical keys 118A are displayed to input content (e.g., characters, search results, etc.) into text edit region 116C (e.g., for composing messages that are sent and displayed within output region 116A or for inputting a search query that computing device 110 executes from within graphical keyboard 116B). Keyboard module 122 may receive information from UI module 120 indicating locations associated with input detected by PSD 112 that are relative to the locations of each of the graphical keys. Using a spatial and/or language model, keyboard module 122 may translate the inputs to selections of keys and characters, words, and/or phrases.

For example, PSD 112 may detect user input as a user of computing device 110 provides inputs at or near a location of PSD 112 where PSD 112 presents graphical keys 118A. UI module 120 may receive, from PSD 112, an indication of the user input detected by PSD 112 and output, to keyboard module 122, information about the user input. Information about the user input may include an indication of one or more touch events (e.g., locations and other information about the input) detected by PSD 112.

Based on the information received from UI module 120, keyboard module 122 may map detected user inputs at PSD 112 to selections of graphical keys 118A, determine characters based on selected graphical keys 118A, and predict or autocorrect words and/or phrases determined based on the characters associated with the selected graphical keys 118A. For example, keyboard module 122 may include a spatial model that may determine, based on the locations of keys 118A and the information about the input, the most likely one or more graphical keys 118A being selected. Responsive to determining the most likely one or more graphical keys 118A being selected, keyboard module 122 may determine one or more characters, words, and/or phrases. For example, each of the one or more graphical keys 118A being selected from a user input at PSD 112 may represent an individual character or a keyboard operation. Keyboard module 122 may determine a sequence of characters selected based on the one or more selected graphical keys 118A. In some examples, keyboard module 122 may apply a language model to the sequence of characters to determine one or more likely candidate letters, morphemes, words, and/or phrases that a user is trying to input based on the selection of graphical keys 118A.

Keyboard module 122 may send the sequence of characters and/or candidate words and phrases to UI module 120 and UI module 120 may cause PSD 112 to present the characters and/or candidate words determined from a selection of one or more graphical keys 118A as text within edit region 116C. In some examples, when functioning as a traditional keyboard for performing text-entry operations, and in response to receiving a user input at graphical keys 118A (e.g., as a user is typing at graphical keyboard 116B to enter text within edit region 116C), keyboard module 122 may cause UI module 120 to display the candidate words and/or phrases as one or more selectable spelling corrections and/or selectable word or phrase suggestions within suggestion region 118B.

In addition to performing traditional, graphical keyboard operations used for text-entry, keyboard module 122 of computing device 110 also provides integrated search capability. That is, rather than requiring a user of computing device 110 to navigate away from user interface 114 which provides graphical keyboard 116B and output region 116A (e.g., to a different application or service executing at or accessible from computing device 110), keyboard module 122 may operate in search mode in which keyboard module 122 may execute search operations and present one or more search results within the same region of PSD 112 at which graphical keyboard 116B is displayed.

As indicated above, keyboard module 122 may execute as a stand-alone application, service, or module executing at computing device 110 or as a single, integrated sub-component thereof. Therefore, if keyboard module 122 forms part of a chat or messaging application executing at computing device 110, keyboard module 122 may provide the chat or messaging application with text-entry capability as well as search capability. Similarly, if keyboard module 122 is a stand-alone application or subroutine that is invoked by an application or operating platform of computing device 110 any time an application or operating platform requires graphical keyboard input functionality, keyboard module 122 may provide the invoking application or operating platform with text-entry capability as well as search capability.

Keyboard module 122 may further operate in search mode, as opposed to text entry mode. In some examples, when operating in text entry mode, keyboard module 122 may cause graphical keyboard 116B to include search element 118C. Search element 118C represents a selectable element of graphical keyboard 116B for invoking one or more of the various search features of graphical keyboard 116B, such as invoking the search mode. By selecting search element 118C (e.g., by tapping or gesturing at a location or within a region of PSD 112 at which search element 118C is displayed), a user can cause computing device 110 to invoke the various integrated search features without having to navigate to a separate application, service, or other feature executing at or accessible from computing device 110.

For example, UI module 120 may output information to keyboard module 122 indicating that a user of computing device 110 may have selected search element 118C. Responsive to determining that search element 118C was selected, keyboard module 122 may transition to operating in search mode. While operating in search mode, keyboard module 122 may reconfigure graphical keyboard 116B to execute search features as opposed to operations that are primarily attributed to text entry to text edit region 116C. In some examples, keyboard module 122 may still enable text entry via graphical keys 118A.

For example, keyboard module 122 may configure suggestion region 118B to present suggested content (e.g., predicted search queries, predicted emoticons or so called "emojis", or other suggested content) as selectable elements within suggestion region 118B instead of predicted characters, words or phrases or other primarily linguistic information that keyboard module 122 derives from a language model, lexicon, or dictionary. In other words, rather than providing spelling or word suggestions from a dictionary within suggestion region 118B, computing device 110 may present, within suggestion region 118B, suggested search related content that computing device 110 determines may assist a user in providing input related to electronic communications.

As another example, in response to receiving an indication that a user may have selected search element 118C, keyboard module 122 may configure suggestion region 118B to present search queries input using graphical keys 118A instead of predicted characters, words or phrases or other primarily linguistic information that keyboard module 122 derives from a language model, lexicon, or dictionary. In other words, rather than providing spelling or word suggestions from a dictionary within suggestion region 118B, computing device 110 may present, within suggestion region 118B, search queries input using graphical keys 118A.

In operation, computing device 110 may determine, based on user input, a search query. In some examples, the user input may include selection of one or more graphical keys 118A of graphical keyboard 116B. For example, keyboard module 122 may receive, from UI module 120, indications of user input at locations of PSD 112 corresponding to graphical keyboard 116B indicating a search query. In some examples, keyboard module 122 may receive, from UI module 120, an indication of a user input selecting search element 118C. In response, keyboard module 122 may invoke the search mode, and may configure suggestion region 118B to present search queries input using one or more graphical keys 118A.

In some examples, keyboard module 122 may configure suggestion region 118B to display search queries with a different format than predicted characters, words or phrases so that a user may visually distinguish search queries from predicted characters, words or phrases. For example, keyboard module 122 may configure suggestion region 118B to display search queries with a predetermined text color, font, font size, etc., or adjacent to or within a distinguishing user interface element, such as a text box, to visually differentiate a search query from predicted characters, words or phrases.

In the search mode, keyboard module 122 may receive, from UI module 120, an indication of a user input selecting or attempting to select one or more graphical keys 118A. Keyboard module 122 may include a spatial model, a language model, or both, which may determine, based on locations of keys 118A, information about the input, and a sequence of characters, the most likely one or more letters, morphemes, words, and/or phrases that a user is trying to input based on the selection of keys 118A. Keyboard module 122 may cause UI module 120 to output the candidate letters, morphemes, words, and/or phrases within suggestion region 118B as the search query. In some examples, keyboard module 122 may cause UI module 120 to output multiple candidate letters, morphemes, words, and/or phrases, e.g., by expanding suggestion region 118B to present multiple candidate letters, morphemes, words, and/or phrases as individual lines of text.

Keyboard module 122 may receive, from UI module 120, an indication of a user input indicating completion of the search query, which may correspond to a user selecting a user interface element displayed at PSD 112, such as one of graphical keys 118A (e.g., the RETURN/SEARCH key illustrated in FIG. 1); one of the candidate letters, morphemes, words, and/or phrases displayed at suggestion region 118B; etc. In response, keyboard module 122 may determine the search query, e.g., as the letters, morphemes, words, and/or phrases displayed at suggestion region 118B at the time of the user input indicating completion of the search query or the selected one or the multiple candidate letters, morphemes, words, and/or phrases displayed in an expanded suggestion region 118B.

In other examples, rather than receiving, from UI module 120, an indication of a user input selecting search element 118C to invoke the search mode then receiving, from UI module 120, an indication of a user input selecting or attempting to select one or more graphical keys 118A, keyboard module 122 may determine a predicted search query based on content of output region 116A, text edit region 116C, or both. For example, as illustrated in FIG. 1, output region 116A is an application such as a messaging or chat application, and illustrates communications from the user of computing device 110 (under "YOU") and communications from a user of another computing device (under "FRIEND"). In other examples, output region 116A may be another application user interface, such as a notes application, a web browser, a search application, a maps application, an email application, a text editor application, or any other application for which graphical keyboard 116B provides text input.

In some examples, keyboard module 122 may determine a predicted query based on content of the communication from the user of computing device 110. For example, FIG. 1 illustrates the content of the communication from the user of computing device 110 as being "Dinner tonight?" Based on the content of this communication, keyboard module 122 has determined a predicted search query "restaurants". Keyboard module 122 then outputs an indication of the predicted search query to UI module 120, which causes the predicted search query "restaurants" to be output at suggestion region 118B.

In some examples, keyboard module 122 may analyze only content of communications from the user of computing device 110 to determine a predicted search query. In other words, in some examples, keyboard module 122 may refrain from analyzing content of communications from a user of another computing device to determine a predicted search query. In other examples, keyboard module 122 may analyze content of communications from a user of another computing device (and received by computing device 110) to determine a predicted search query.

Computing device 110 may determine a predicted search query based on content of the communication from the user of computing device 110, content of the communication from the user of the other computing device, or both, only if the computing device receives permission from the user of the respective computing device to analyze the information. For example, before computing device 110 can collect or may make use of information associated with a user of computing device 110 or a user of another computing device, the user may be provided with an opportunity to provide input to control whether programs or features of computing device 110 can collect and make use of user information (e.g., information about a user's current location, current speed, text conversations, etc.), or to dictate whether and/or how to computing device 110 may receive content that may be relevant to the user. In addition, certain data may be treated in one or more ways before it is stored or used by computing device 110, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing device 110.

In some examples, keyboard module 122 may transmit instructions to UI module 120 to cause the predicted search query to be displayed with a different visual appearance than predicted characters, words or phrases. For example, keyboard module 122 transmit instructions to UI module 120 to cause the predicted search query to be displayed with a predetermined text color, font, font size, etc., or adjacent to or within a distinguishing user interface element, such as a text box, an underline, an icon or picture, etc. to visually differentiate a search query from predicted characters, words or phrases. This may allow a user of computing device 110 to easily distinguish between a predicted search query and predicted characters, words or phrases.

If the user decides to perform a search, the user may select suggestion region 118B or the predicted search query displayed at suggestion region 118B. Keyboard module 122 may receive an indication of the selection of suggestion region 118B or the predicted search query displayed at suggestion region 118B from UI module 120, and may determine that the search query is the predicted search query displayed at suggestion region 118B.

Computing device 110 then may retrieve one or more search results based on the search query. In some examples, computing device 110 may retrieve the one or more search results by transmitting the search query to a data service. In some examples, the data service may be, for example, a search system or a cloud-based computing service remote from computing device 110. In response to receiving the search query, and based on content of the search query, the data service may perform a search. The search may include, for example, a search of webpages; a search of a semantic network including objects, facts, and relationships between the objects; an image search; a video search; a search localized to a location of the user of computing device 110; etc. The data service then may transmit at least one search result to computing device 110, and computing device 110 may receive the at least one search result. The one or more search results may include textual information, images, videos, hyperlinks, etc.

In some examples, computing device 110 may retrieve the one or more search results by performing a search based on content of the search query. The search may include, for example, a search of webpages; a search of a semantic network including objects, facts, and relationships between the objects; an image search; a video search; a search localized to a location of the user of computing device 110; etc.

Keyboard module 122 of computing device 110 may retrieve the one or more search results and cause UI module 120 to output a visual representation of at least a portion of the one or more search results in place of at least a portion of graphical keyboard 116B. For example, keyboard module 122 may cause UI module 120 to output the visual representation of at least a portion of the one or more search results in place of at least some keys of graphical keys 118A.

In some examples, keyboard module 122 of computing device 110 may cause UI module 120 to output the visual representation as a card-based user interface element. The card-based user interface element may appear similar to a notecard, and may include a representation of a particular search result of the one or more search results. The representation of the particular search result may include, for example, at least one of text, a picture, an icon, or the like.

Keyboard module 122 may generate a respective card-based user interface element for each respective search result of the one or more search results. Keyboard module 122 may cause UI module 120 to output at least one card-based user interface element for display at a time, and UI module 120 may be configured to switch between respective card-based user interface elements in response to determining a user gesture, e.g., a swipe. In this way, keyboard module 122 may enable a user to switch among one or more search results within graphical keyboard 116B.

In some examples, keyboard module 122 may be configured to determine based on an indication of user input received from UI module 120, selection of a predetermined portion of the visual representation of a search result. In response to determining the selection, keyboard module 122 may be configured to automatically, without further user input, output an indication of information related to the search result to UI module 120, which is configured to insert the information related to the search result in text edit region 116C. The information related to the search result may include, for example, text, a hyperlink, an image, an icon, etc. In some examples, the selection of the predetermined portion of the visual representation of the search result may include a tap gesture in which the user taps the predetermined portion of the visual representation of the search result. In response keyboard module 122 may be configured to insert a textual representation of the search result in text edit region 116C or output region 116A. In some examples, the selection of the predetermined portion of the visual representation of the search result may include a drag gesture in which the user is dragging the visual representation of the search result to text edit region 116C or output region 116A. In response, keyboard module 122 may be configured to insert an image of the search result or a portion of the search result in text edit region 116C or output region 116A. In this way, computing device 110 is configured to allow one-gesture input of information from the search result to the text edit region 116C, enabling easy and efficient entry of information from the search result to the application for which graphical keyboard 116B is being used to input text.

In this way, the techniques of the disclosure may enable a computing device to provide a graphical keyboard with integrated search features that include display of a visual representation of at least a portion of one or more search results in place of at least a portion of the graphical keyboard. Further, in some examples, the visual representation may include a card-based user interface element, and computing device 110 may be configured to output different card-based user interface elements, corresponding to different search results determined based on the search query, in response to receiving an indication of a user input, such as a swipe gesture. Additionally, computing device 110 may be configured to determine, based on user input, selection of a predetermined portion of the visual representation of the at least a portion (e.g., a search result) of the one or more search results and, automatically, without further user input, insert, in text edit region 116C displayed adjacent to graphical keyboard 116B, information related to the at least a portion (e.g., a search result) of the one or more search results.

In this way, computing device 110 may facilitate insertion of information from the search result in the application for which graphical keyboard 116B is providing input. Further, by inserting the information from the search result in text edit region 116C with a single user input, computing device 110 may allow the user to input information with fewer inputs than a typical, multi-gesture copy and paste action. In this way, computing device 110 may facilitate information retrieval using a search query and insertion of the retrieved information in an application without application switching and with few user inputs.

Figure 2:
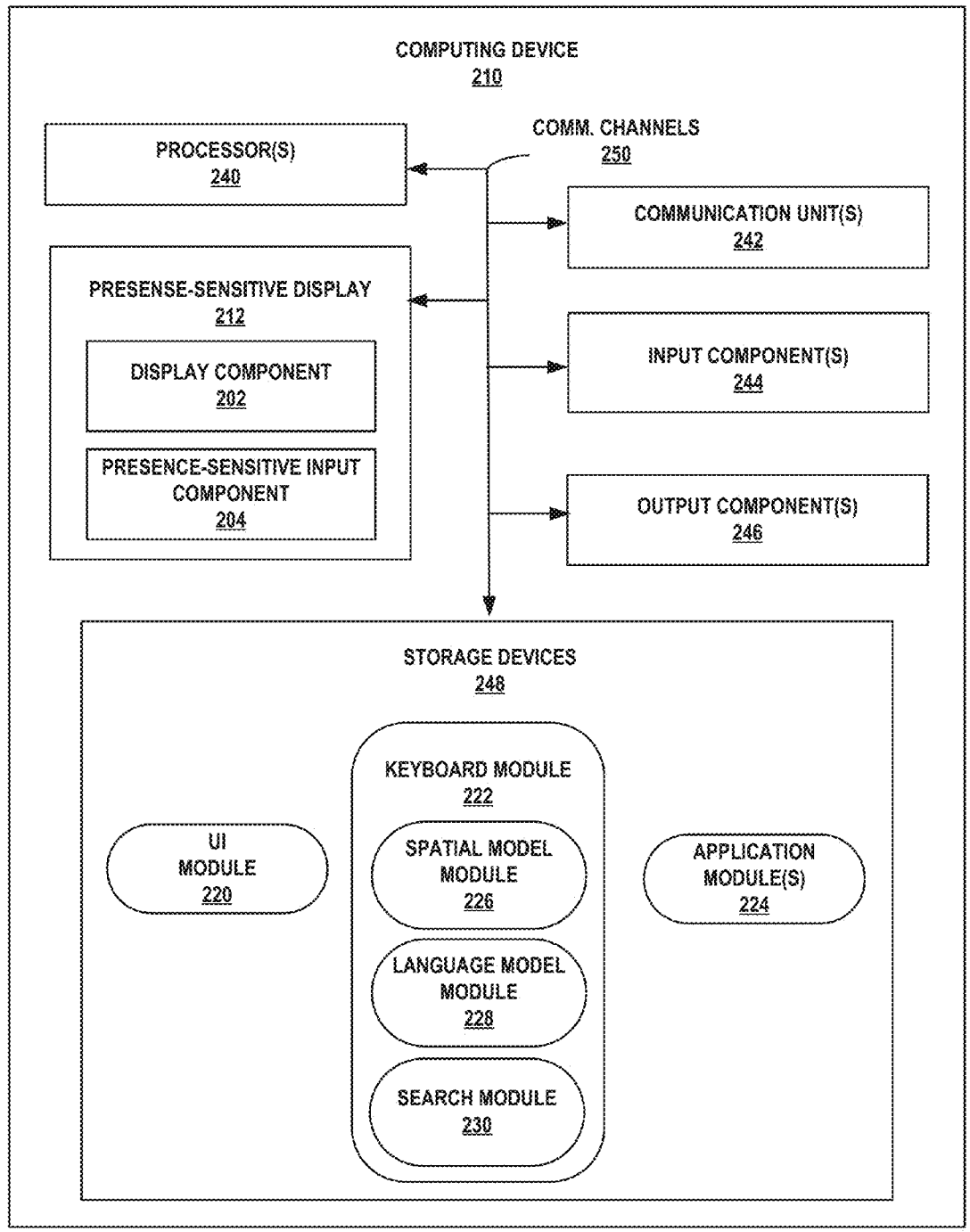
FIG. 2 is a block diagram illustrating an example computing device that is configured to present a graphical keyboard with integrated search features, in accordance with one or more aspects of the present disclosure.

FIG. 2 is a block diagram illustrating computing device 210 as an example computing device that is configured to present a graphical keyboard with integrated search features, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes presence-sensitive display (PSD 212), one or more processors 240, one or more communication units 242, one or more input components 244, one or more output components 246, and one or more storage components 248. PSD 212 includes display component 202 and presence-sensitive input component 204. Storage components 248 of computing device 210 include UI module 220, keyboard module 222, and one or more application modules 224. Keyboard module 222 may include spatial model ("SM") module 226, language model ("LM") module 228, and search module 230. Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 may be similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus, that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202. Other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

While illustrated as an internal component of computing device 210, PSD 212 may also represent an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations of modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, 226, 228, and 230. Storage components 248 may include a memory configured to store data or other information associated with modules 220, 222, 224, 226, 228, and 230.

UI module 220 may include all functionality of UI module 120 of computing device 110 of FIG. 1 and may perform similar operations as UI module 120 for managing a user interface (e.g., user interface 114) that computing device 210 provides at PSD 212 for handling input from a user. For example, UI module 220 of computing device 210 may query keyboard module 222 for a keyboard layout (e.g., an English language QWERTY keyboard, etc.). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220 over communications channels 250. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 222 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIG. 1 and may perform similar operations as keyboard module 122 for providing a graphical keyboard having integrated search features. Keyboard module 222 may include various sub-modules, such as spatial model (SM) module 226, language model (LM) module 228, and search module 230, which may perform the functionality of keyboard module 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

When keyboard module 222 operates in text-entry mode, LM module 228 may receive a character or sequence of characters as input, and output one or more candidate characters, words, or phrases that LM module 228 identifies from a lexicon as being potential replacements for a sequence of characters that LM module 228 receives as input for a given language context (e.g., a sentence in a written language). Keyboard module 222 may cause UI module 220 to present one or more of the candidate words or phrases at suggestion regions 118C of user interface 114.

The lexicon of computing device 210 may include a list of words within a written language vocabulary (e.g., a dictionary). For instance, the lexicon may include a database of words (e.g., words in a standard dictionary and/or words added to a dictionary by a user or computing device 210). LM module 228 may perform a lookup in the lexicon of a character string to identify one or more letters, words, and/or phrases that include parts or all of the characters of the character string. For example, LM module 228 may assign a language model probability or a similarity coefficient (e.g., a Jaccard similarity coefficient) to one or more candidate words located at a lexicon of computing device 210 that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 228. In response to determining the one or more candidate words, LM module 228 may output the one or more candidate words from lexicon data stores 260A that have the highest similarity coefficients.

Search module 230 of keyboard module 222 may perform integrated search functions on behalf of keyboard module 222. That is, when invoked (e.g., in response to a user of computing device 210 selecting selectable element 218C of user interface 114), keyboard module 222 may operate in search mode where keyboard module 222 enables computing device 210 to perform search functions from within graphical keyboard 118A.

In operation, search module 230 may determine, based on user input, a search query. In some examples, the user input may include selection of one or more graphical keys 118A of graphical keyboard 116A (FIG. 1). For example, search module 230 may receive, from UI module 220, indications of user input at locations of PSD 212 corresponding to graphical keyboard 116B indicating a search query. In some examples, search module 230 may receive, from UI module 220, an indication of a user input selecting search element 118C (FIG. 1). In response, keyboard module 222 may invoke the search mode, and may configure suggestion region 118B (FIG. 1) to present search queries input using one or more graphical keys 118A.

In some examples, keyboard module 222 may configure suggestion region 118B to display search queries with a different format than predicted characters, words or phrases so that a user may visually distinguish search queries from predicted characters, words or phrases. For example, keyboard module 222 may configure suggestion region 118B to display search queries with a predetermined text color, font, font size, etc., or adjacent to or within a distinguishing user interface element, such as a text box, to visually differentiate a search query from predicted characters, words or phrases.

In the search mode, search module 230 may receive, from UI module 220, an indication of a user input selecting or attempting to select one or more graphical keys 118A (e.g., a touch event). SM module 226 may determine a character or sequence of characters that likely represents the one or more touch events. LM module 228 may receive the character or sequence of characters that likely represents the one or more touch events from SM module 226, and may determine the most likely one or more letters, morphemes, words, and/or phrases that a user is trying to input. LM module 228 of keyboard module 222 may cause UI module 220 to output the candidate letters, morphemes, words, and/or phrases within suggestion region 118B as the search query. In some examples, keyboard module 222 may cause UI module 220 to output multiple candidate letters, morphemes, words, and/or phrases, e.g., by expanding suggestion region 118B to present multiple candidate letters, morphemes, words, and/or phrases as individual lines of text.

Search module 230 may receive, from UI module 220, an indication of a user input indicating completion of the search query, which may correspond to a user selecting a user interface element displayed at PSD 212, such as one of graphical keys 118A (e.g., the RETURN/SEARCH key illustrated in FIG. 1); selecting one of the candidate letters, morphemes, words, and/or phrases displayed at suggestion region 118B; etc. In response, search module 230 may determine the search query, e.g., as the letters, morphemes, words, and/or phrases displayed at suggestion region 118B at the time of the user input indicating completion of the search query or the selected one or the multiple candidate letters, morphemes, words, and/or phrases displayed in an expanded suggestion region 118B.

In other examples, rather than receiving, from UI module 220, an indication of a user input selecting search element 118C to invoke the search mode then receiving, from UI module 220, an indication of a user input selecting or attempting to select one or more graphical keys 118A, search module 230 may determine a predicted search query based on content of output region 116A, text edit region 116C, or both. For example, search module 230 may determine a predicted query based on content of a communication input using graphical keyboard 116B by the user of computing device 210. Keyboard module 222 then outputs an indication of the predicted search query to UI module 220, which causes the predicted search query to be output at suggestion region 118B.

In some examples, search module 230 may analyze only content of communications from the user of computing device 210 to determine a predicted search query. In other words, in some examples, search module 230 may refrain from analyzing content of communications from a user of another computing device to determine a predicted search query. In other examples, search module 230 may analyze content of communications from a user of another computing device (and received by computing device 210) to determine a predicted search query.

Search module 230 may determine a predicted search query based on content of the communication from the user of computing device 210, content of the communication from the user of the other computing device, or both, only if the computing device receives permission from the user of the respective computing device to analyze the information. For example, before computing device 210 can collect or may make use of information associated with a user of computing device 210 or a user of another computing device, the user may be provided with an opportunity to provide input to control whether programs or features of computing device 210 can collect and make use of user information (e.g., information about a user's current location, current speed, text conversations, etc.), or to dictate whether and/or how to computing device 210 may receive content that may be relevant to the user. In addition, certain data may be treated in one or more ways before it is stored or used by computing device 210, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing device 210.

If the user decides to perform a search, the user may select suggestion region 118B or the predicted search query displayed at suggestion region 118B. Search module 230 may receive an indication of the selection of suggestion region 118B or the predicted search query displayed at suggestion region 118B from UI module 220, and may determine that the search query is the predicted search query displayed at suggestion region 118B.

Search module 230 then may retrieve one or more search results based on the search query. In some examples, search module 230 may retrieve the one or more search results by causing communication units 242 to transmit the search query to a data service. The data service may include, for example, a search system, a cloud-based computing environment, etc. In response to receiving the search query, and based on content of the search query, the data service may perform a search. The search may include, for example, a search of webpages, a relational or hierarchical knowledge collection search, an image search, a video search, a search localized to a location of computing device 210, etc. The data service then may transmit at least one search result to computing device 210, and communication units 242 may receive the at least one search result. The one or more search results may include textual information, images, videos, hyperlinks, etc.

In some examples, search module 230 may retrieve one or more search results based on the search query by performing a search based on content of the search query. The search may include, for example, a search of webpages, a relational or hierarchical knowledge collection search, an image search, a video search, a search localized to a location of computing device 210, etc. The one or more search results may include textual information, images, videos, hyperlinks, etc.

Search module 230 may retrieve the at least one search result from communication units 242. Search module 230 may cause UI module 220 to output a visual representation of at least a portion of the one or more search results in place of at least a portion of graphical keyboard 116B. For example, search module 230 may cause UI module 220 to output the visual representation of at least a portion of the one or more search results in place of at least some keys of graphical keys 118A.

In some examples, search module 230 may cause UI module 220 to output the visual representation as a card-based user interface element. The card-based user interface element may appear similar to a notecard, and may include a representation of a particular search result of the one or more search results. The representation of the particular search result may include, for example, at least one of text, an image, an icon, etc.

Search module 230 may generate a respective card-based user interface element for each respective search result of the one or more search results. Search module 230 may cause UI module 220 to output at least one card-based user interface element for display at a time, and UI module 220 may be configured to switch between respective card-based user interface elements in response to determining a user gesture, e.g., a swipe. In this way, search module 230 and UI module 220 may enable a user to switch among search results within graphical keyboard 116B.

In some examples, the visual representation may be divided into multiple, different portions. For example, a first portion of the visual representation may include a representation of content of the particular search result, such as text, an image, an icon associated with the particular search result, etc., and a second portion may be associated with an action performed by an application other than the graphical keyboard 116B.

In some examples, search module 230 may be configured to determine, based on an indication of user input at PSD 212 received from UI module 220 (e.g., an indication of a touch event), selection of the first portion of the visual representation of a search result. In response to determining the selection of the first portion of the visual representation, search module 230 may be configured to automatically, without further user input, output an indication of information related to the search result to UI module 220 and cause UI module 220 to insert the information related to the search result in text edit region 116C (FIG. 1). The information related to the search result may include, for example, text, a hyperlink, an image, a video, an icon, etc. In some examples, the selection of the first portion of the visual representation of the search result may include a tap gesture in which the user taps the first portion of the visual representation of the search result. In response keyboard module 122 may be configured to insert a textual representation of the search result in text edit region 116C or output region 116A. In some examples, the selection of the first portion of the visual representation of the search result may include a drag gesture in which the user is dragging the visual representation of the search result to text edit region 116C or output region 116A. In response, keyboard module 122 may be configured to insert an image of the search result or a portion of the search result in text edit region 116C or output region 116A. In this way, search module 230 is configured to allow one-gesture input of information related to the search result to the text edit region 116C, enabling easy and efficient entry of information from the search result to the application for which graphical keyboard 116B is being used to input text.

The second portion of the visual representation may be associated with an action performed by an application other than the graphical keyboard 116B. For example, the second portion may include at least one user interface element (e.g., icon, image, text etc.) associated with the action, which, when selected by a user, causes UI module 220 to output the touch event to another application module of applications module 224 to perform the indicated action. The user interface element may include an element associated with applications including a web browser, a dedicated search application, a phone application, a maps application, etc. As a particular example, the user interface element may include a phone icon, with or without accompanying text (such as "Call"); a hyperlink; an icon representative of directions, with or without accompanying text (such as "Navigate"); a play button icon, with or without accompanying text (such as "Play"); etc. In response to receiving, from PSD 212, a touch event, UI module 220 may determine selection of the second portion of the visual representation of the search result (or a particular user interface element of the second portion), and may transmit an indication of the selection of the second portion of the visual representation to the associated application, which may perform the action associated with the second portion or the user interface element of the second portion. In this way, in addition to allowing insertion of information from the search result into the application for which the graphical keyboard is being used to input text, search module 230 may present a user with shortcuts to actions performed by other applications.

In this way, the techniques of the disclosure may enable keyboard module 222 computing device 210 to provide a graphical keyboard with integrated search features that include display of a visual representation of at least a portion of one or more search results in place of at least a portion of the graphical keyboard. Further, in some examples, the visual representation may include a card-based user interface element, and computing device 210 may be configured to output different card-based user interface elements, corresponding to different search results determined based on the search query, in response to receiving an indication of a user input, such as a swipe gesture. Additionally, computing device 210 may be configured to determine, based on user input, selection of a predetermined portion of the visual representation of the at least a portion (e.g., a search result) of the one or more search results and, automatically, without further user input, insert, in text edit region 116C displayed adjacent to graphical keyboard 116B, information related of the at least a portion (e.g., a search result) of the one or more search results.

Figure 3:
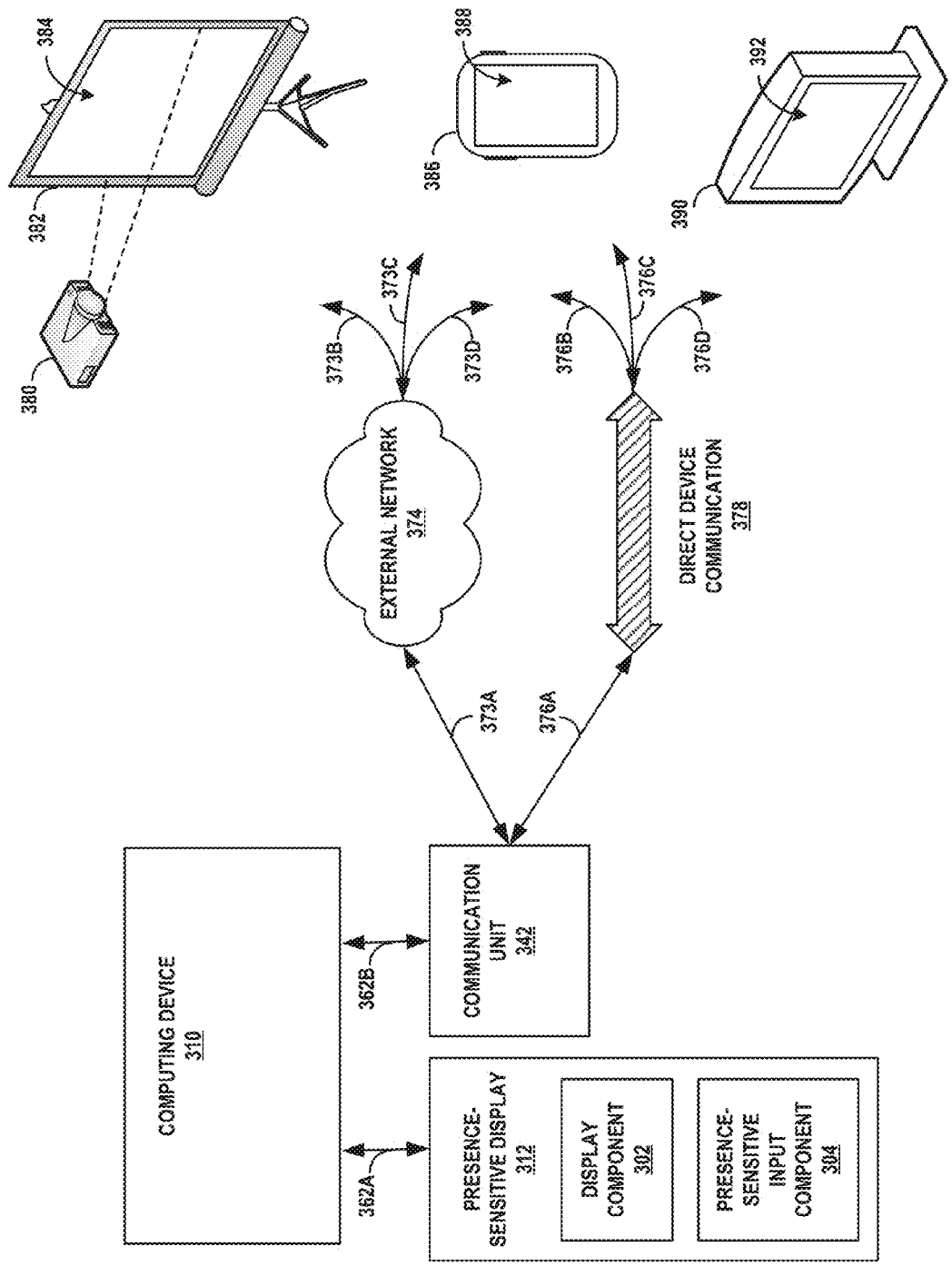
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, a smart television platform, a camera, a personal digital assistant (PDA), an automobile navigation or entertainment device, a kiosk, a server, a mainframe, etc.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 312. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 312 to output the graphical keyboard. In response to receiving a user input at PSD 312 to select one or more keys of the keyboard, visual display device 130 may send an indication of the user input to computing device 310 using external network 374. Communication unit 342 of may receive the indication of the user input, and send the indication to computing device 310.

Computing device 310 may select, based on the user input, one or more keys or user interface elements (e.g., a suggested or predicted search query). Computing device 310 may determine, based on the selection of one or more keys or user interface elements, a search query. In some examples, computing device 310 may retrieve one or more search result based on the search query. Computing device 310 may output a representation of an updated graphical user interface including an updated graphical keyboard in which at least a portion of the one or more search results (e.g., a search result) is displayed instead of at least a portion of the graphical keyboard (e.g., at least one graphical key of the graphical keyboard). Communication unit 342 may receive the representation of the updated graphical user interface and may send the send the representation to visual display component 390, such that visual display component 390 may cause PSD 312 to output the updated graphical keyboard, including at least a portion of the one or more search results (e.g., a search result) displayed instead of at least a portion of the graphical keyboard (e.g., at least one graphical key of the graphical keyboard).

In some examples, computing device 310 may be configured to determine, based on an indication of user input received at PSD 312, selection of a predetermined portion of the visual representation of a search result. In response to determining the selection, computing device 310 may be configured to automatically, without further user input, output a representation of an updated graphical user interface including an updated graphical keyboard in which information related to the search result is displayed in a text edit region adjacent to the graphical keyboard. In this way, computing device 310 is configured to allow one-gesture input of information from the search result to the text edit region, enabling easy and efficient entry of information from the search result to the application for which the graphical keyboard is being used to input text.

Figure 4A:
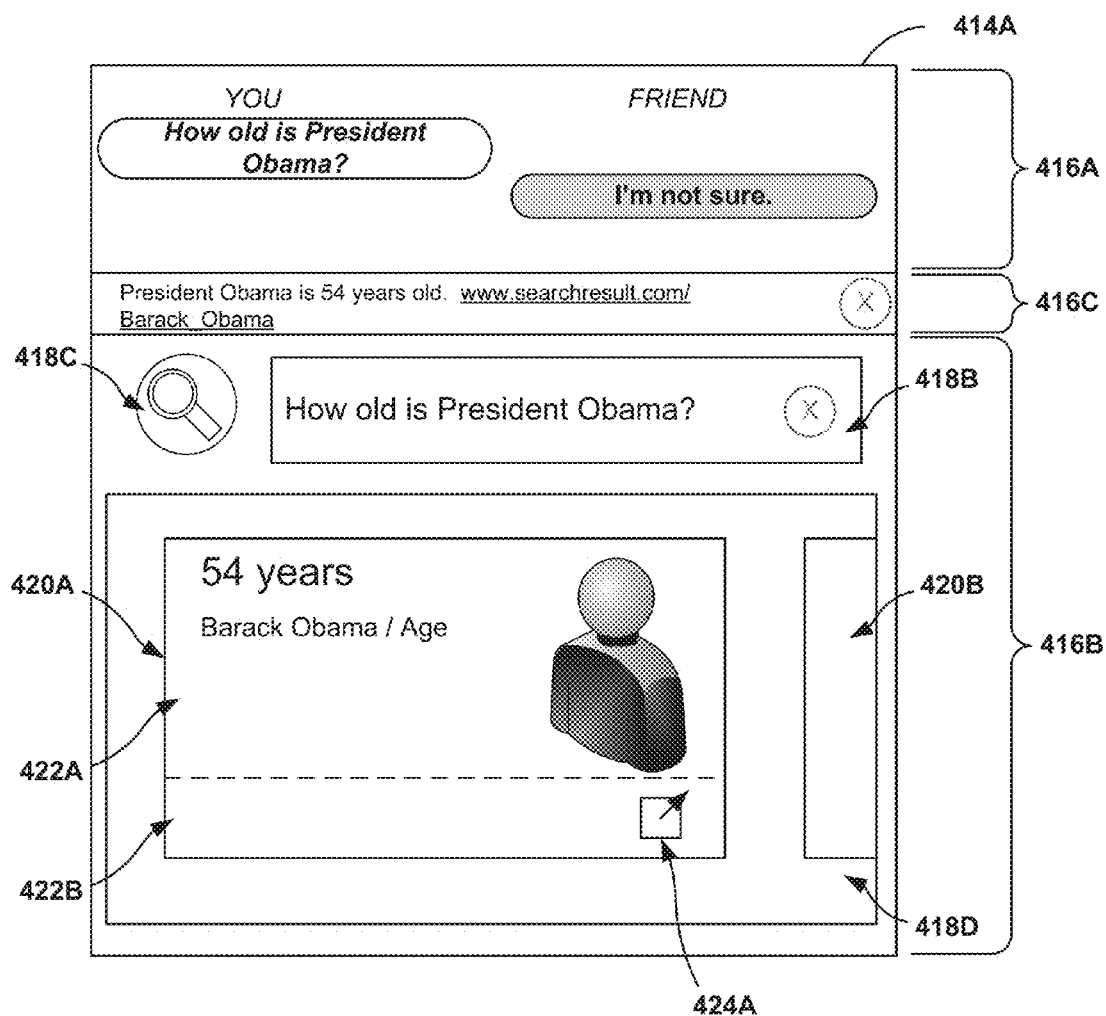
FIGS. 4A and 4B are conceptual diagrams illustrating example graphical user interfaces of an example computing device that is configured to present a graphical keyboard with integrated search features, in accordance with one or more aspects of the present disclosure.
Figure 4B:
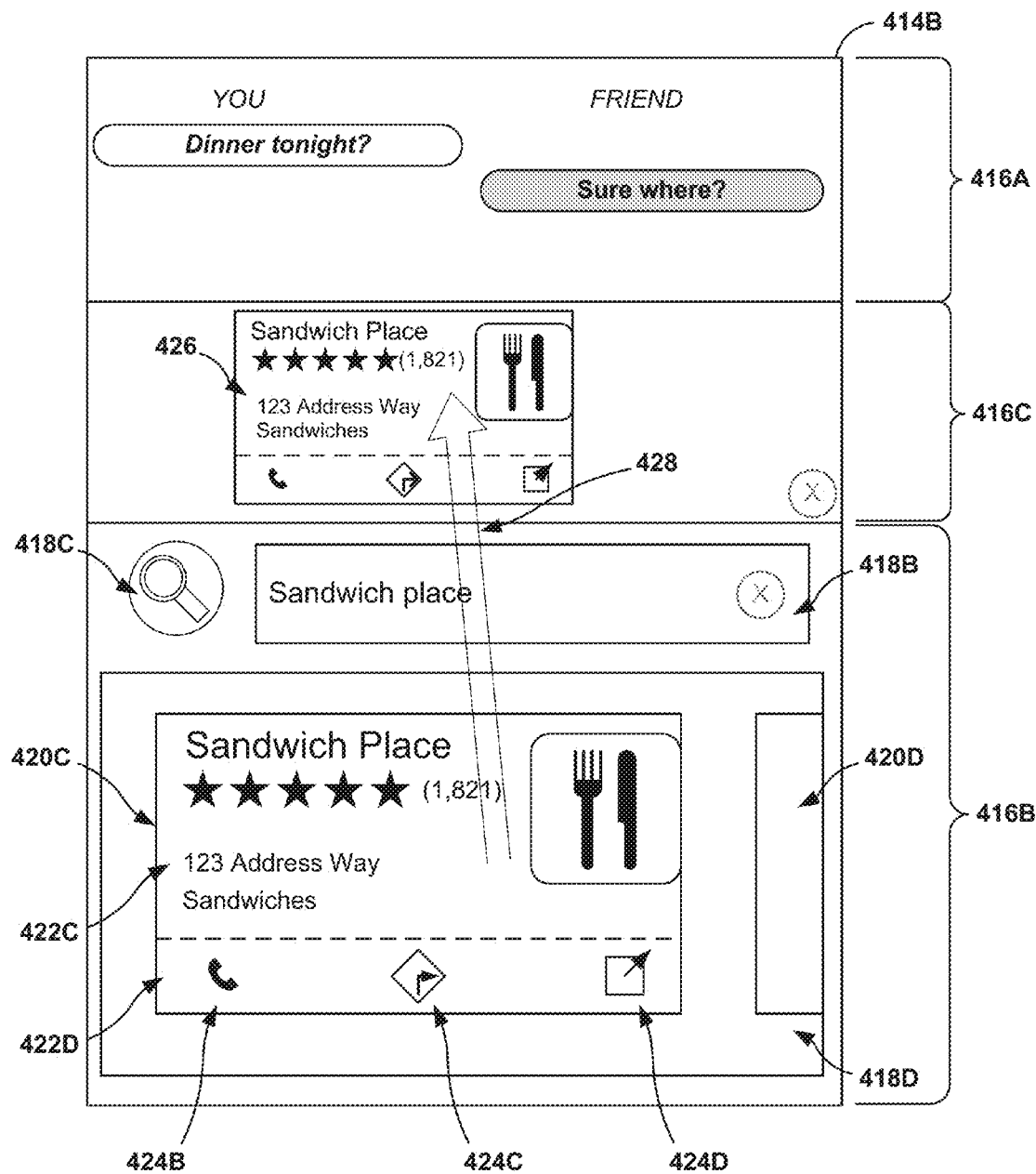

FIGS. 4A and 4B are conceptual diagrams illustrating example graphical user interfaces of an example computing device that is configured to present a graphical keyboard with integrated search features, in accordance with one or more aspects of the present disclosure. FIGS. 4A and 4B illustrate, respectively, example graphical user interfaces 414A and 414B (collectively, user interfaces 414). However, many other examples of graphical user interfaces may be displayed in other instances. Each of graphical user interfaces 414 may correspond to a graphical user interface displayed by computing devices 110, 210, or 310 of FIGS. 1-3, respectively. FIGS. 4A and 4B are described below in the context of computing device 110 for ease of description only, and may be displayed by any computing device.

Graphical user interface 414A of FIG. 4A includes a graphical keyboard 416B includes an output region 416A, a graphical keyboard 416B, and a text edit region 416C. Output region 416A is a graphical user interface of an application. For example, as illustrated in FIG. 4A, output region 416A is a graphical user interface of a messaging or chat application, and illustrates communications from the user of the computing device displaying graphical user interface 414A (under "YOU") and communications from a user of another computing device (under "FRIEND"). In other examples, output region may be another application user interface, such as a notes application, a web browser, a search application, a maps application, an email application, a text editor application, or any other application for which graphical keyboard 116B provides text input. Text edit region 416C is the region of graphical user interface 414A at which text is displayed after being input using graphical keyboard 416B prior to being committed to output region 416A.

Graphical keyboard 416B may include multiple, different views. One view may be similar to or substantially the same as graphical keyboard 116B illustrated in FIG. 1. Other views may include a plurality of symbol keys, a plurality of extended symbol keys, a plurality of keys corresponding to letters or phonemes of a particular language, etc. FIG. 4A illustrates a view of graphical keyboard 416B in which at least a portion of the plurality of keys (in this example, all of the keys) has been replaced by at least a portion of one or more search results returned in response to a search query.

Graphical keyboard 416B includes suggestion region 418B, search element 418C, and search results region 418D. Suggestion region 418B may be similar to or substantially the same as suggestion region 118B illustrated in FIG. 1. For example, suggestion region 418B may alternately be configured to display predicted letters, words, or phrases; predicted search queries; input search queries; etc. In the view illustrated in FIG. 4A, suggestion region 418B is configured to display an input search query, "How old is President Obama?"

Search element 418C may be similar to or substantially the same as search element 118C of FIG. 1. Search element 118C represents a selectable element of graphical keyboard 116B for invoking one or more of the various search features of graphical keyboard 116B, such as invoking the search mode. For example, in response to receiving an indication that a user may have selected search element 418C, keyboard module 122 may configure suggestion region 418B to present search queries input using graphical keys 118A (FIG. 1) instead of predicted characters, words or phrases or other primarily linguistic information that keyboard module 122 derives from a language model, lexicon, or dictionary. An example of this is illustrated in FIG. 4A, in which the search query "How old is President Obama?" is displayed at suggestion region 418B.

Search results region 418D displays a visual representation of one or more search result retrieved by computing device 110 in response to the search query. In some examples, the visual representation of the at least one search result may be a card-based user interface element 420A. Card-based user interface element 420A may appear similar to a notecard, and may include a visual representation of a particular search result of the one or more search results. The representation of the particular search result may include, for example, at least one of text, a picture, an icon, or the like. For example, card-based user interface element 420A includes text indicating an answer to the search query ("54 years" and "Barack Obama/Age") and a picture related to the search query (such as a picture of President Obama).

In some examples, card-based user interface element 420A includes a plurality of predetermined portions. Each predetermined portion of the plurality of predetermined portions may be associated with a different functionality provided by card-based user interface element 420A. For example, card-based user interface element 420A includes a first predetermined portion 422A and a second predetermined portion 422B.

The first predetermined portion 422A of card-based user interface element 420A (the visual representation of a first search result) may include a representation of content of the particular search result, such as text, an image associated with the particular search result, an icon associated with the particular search result, etc. In the example of FIG. 4A, the first predetermined portion 422A includes text indicating an answer to the search query ("54 years" and "Barack Obama/Age") and an image related to the search query (such as a picture of President Obama).

In some examples, keyboard module 122 may be configured to determine, based on an indication of user input at PSD 112 received from UI module 120 (e.g., an indication of a touch event), selection of first predetermined portion 422A. In response to determining the selection of first predetermined portion 422A, keyboard module 122 may be configured to automatically, without further user input, output an indication of information related to of the search result to UI module 120 and cause UI module 120 to insert the information related to the search result in text edit region 416C. The information related to the search result may include, for example, text, a hyperlink, an image, a video, an icon, etc. In this way, keyboard module 122 is configured to allow one-gesture input of information from the search result to the text edit region 416C, enabling easy and efficient entry of information from the search result to the application for which graphical keyboard 416B is being used to input text.

The information related to the search result may include, for example, textual information related to the selected search result. For example, as shown in FIG. 4A, the information related to the selected search result includes a text answer to the search query ("President Obama is 54 years old."). In some examples, the text answer may be formatted as a natural language response to the search query. In the example of FIG. 4A, the information related to the selected search result also includes a hyperlink to a website related to the selected search result, which may allow the user of computing device 110 or the user of the other computing device (e.g., "FRIEND" in FIG. 4A) to select the hyperlink to access more information related to the search result once the content in text edit region 416C is committed to output region 416A. In some examples, selection of first portion 422A of card-based user interface element 420A may include a tap gesture in which a user taps first portion 422A of card-based user interface element 420A, and in response, keyboard module 122 may be configured to insert a textual representation of the search result in text edit region 416C or output region 416A.

The information related to the selected search result also may include an image (such as an image of President Obama, an image of card-based user interface element 420A, or an image of a portion of card-based user interface element 420A), an icon, etc. In some examples, the selection of the first portion 422A of card-based user interface element 420A may include a drag gesture in which the user is dragging card-based user interface element 420A to text edit region 416C or output region 416A. In response, keyboard module 122 may be configured to insert an image of card-based user interface element 420A or a portion of card-based user interface element 420A in text edit region 416C or output region 416A.

Card-based user interface element 420A also includes second predetermined portion 422B, which is associated with an action performed by an application other than graphical keyboard 416B. For example, second predetermined portion 422B includes at least one user interface element (e.g., icon, image, text etc.) associated with the action, which, when selected by a user, causes UI module 120 to output the touch event to another application module to perform the indicated action. The user interface element may include an element associated with applications including a web browser, a dedicated search application, a phone application, a maps application, etc. As a particular example, the user interface element may include a phone icon, with or without accompanying text (such as "Call"); a hyperlink; an icon representative of directions, with or without accompanying text (such as "Navigate"); a play button icon, with or without accompanying text (such as "Play"); etc.

In the example of FIG. 4A, the user interface element includes go-to icon 424A. Go-to icon 424A is associated with an action of opening a new application related to the search result displayed in card-based user interface element 420A, such as a search application or a website from which the information in the search result was retrieved. In response to receiving, from PSD 112, a touch event, UI module 120 may determine selection of the second predetermined portion 422B or go-to icon 424A, and may transmit an indication of the selection of second predetermined portion 422B to the associated application, which may perform the action associated with the second predetermined portion 422B or go-to icon 424A. In this way, in addition to allowing insertion of information related to the search result into the application for which the graphical keyboard is being used to input text, keyboard module 122 may present a user with shortcuts to actions performed by other applications.

In some examples, computing device 110 may retrieve more than one search result in response to a search query. Keyboard module 122 may generate a respective card-based user interface element for each respective search result of the one or more search results. In some examples, keyboard module 122 may cause search results region 418D to display more than one search result (e.g., more than one card-based user interface element 420A. For example, as shown in FIG. 4A, keyboard module 122 may cause search results region 418D to display first card-based user interface element 420A and a portion of a second card-based user interface element 420B. The display of the portion of second card-based user interface element 420B may visually indicate to a user of computing device 110 that additional search results exist and may be viewed by navigating to the second card-based user interface element 420B. For example, keyboard module 122 may cause UI module 120 to switch from card-based user interface element 420A to second card-based user interface element 420B in response to determining a user gesture based on touch events, e.g., a swipe from right to left in FIG. 4A. In this way, keyboard module 122 may enable a user to switch among search results within search results region 418D of graphical keyboard 116B. In some examples, keyboard module 122 may enable a user to switch among card-based user interface elements using swipes to different directions (e.g., right and left), and the card-based user interface elements may be conceptually arranged in a carousel.

FIG. 4B illustrates an example graphical user interface 414B that includes a view of graphical keyboard 416B in which at least a portion of the plurality of keys (in this example, all of the keys) has been replaced by at least a portion of one or more search results returned in response to a search query. Similar to graphical user interface 414A, graphical user interface 414B includes output region 416A, text edit region 416C, and graphical keyboard 416B.

As in FIG. 4A, graphical keyboard 416B includes suggestion region 418B, search element 418C, and search results region 418D. In the view illustrated in FIG. 4B, suggestion region 418B is configured to display an input search query, "Sandwich place".

Search results region 418D displays a visual representation of one or more search result retrieved by computing device 110 in response to the search query. In some examples, the visual representation of the at least one search result may be a card-based user interface element 420C. Card-based user interface element 420C may appear similar to a notecard, and may include a visual representation of a particular search result of the one or more search results. The representation of the particular search result may include, for example, at least one of text, a picture, an icon, or the like. For example, card-based user interface element 420C includes text indicating an answer to the search query. In FIG. 4B, the text indicating an answer to the search query includes a restaurant name ("Sandwich Place"), restaurant rating (5 stars), a number of reviews ("1,821"), an address ("123 Address Way"), a restaurant type ("Sandwiches"), and an image (such as a picture of Sandwich Place).

Similar to card-based user interface element 420A, card-based user interface element 420C includes a first predetermined portion 422C and a second predetermined portion 422D. The first predetermined portion 422C of card-based user interface element 420C (the visual representation of a first search result) may include a representation of content of the particular search result, such as text, an image associated with the particular search result, an icon associated with the particular search result, etc. In FIG. 4B, the text indicating an answer to the search query includes a restaurant name ("Sandwich Place"), restaurant rating (5 stars), a number of reviews ("1,821"), an address ("123 Address Way"), a restaurant type ("Sandwiches"), and an image (such as a picture of Sandwich Place).

In some examples, keyboard module 122 may be configured to determine, based on an indication of user input at PSD 112 received from UI module 120 (e.g., an indication of a touch event), selection of first predetermined portion 422C. In response to determining the selection of first predetermined portion 422C, keyboard module 122 may be configured to automatically, without further user input, output an indication of information related to of the search result to UI module 120 and cause UI module 120 to insert the information related to the search result in text edit region 416C. In this way, keyboard module 122 is configured to allow one-gesture input of information from the search result to the text edit region 416C, enabling easy and efficient entry of information from the search result to the application for which graphical keyboard 416B is being used to input text.

The information related to the search result may include, for example, image or graphical information related to the selected search result. For example, as shown in FIG. 4B, the information related to the selected search result includes a visual representation 426 of card-based user interface element 420C. In some examples, the selection of the first portion 422C of card-based user interface element 420C may include a drag gesture 428 in which the user is dragging card-based user interface element 420C to text edit region 416C or output region 416A. In response, keyboard module 122 may be configured to insert visual representation 426 of card-based user interface element 420C or a visual representation of a portion of card-based user interface element 420C in text edit region 416C or output region 416A.

The information related to the search result may include, for example, textual information related to the selected search result. For example, the information related to the selected search result may include a text answer to the search query ("Sandwich Place 123 Address Way"). In the example of FIG. 4B, the information related to the selected search result also could include a hyperlink to a website that provides directions to Sandwich Place, which may allow the user of computing device 110 or the user of the other computing device (e.g., "FRIEND" in FIG. 4B) to select the hyperlink to access directions to Sandwich Place once the content in text edit region 416C is committed to output region 416A. In some examples, selection of first portion 422C of card-based user interface element 420C may include a tap gesture in which a user taps first portion 422C of card-based user interface element 420C, and in response, keyboard module 122 may be configured to insert a textual representation of the search result in text edit region 416C or output region 416A.

Card-based user interface element 420C also includes second predetermined portion 422D, which is associated with one or more actions performed by an application other than graphical keyboard 416B. For example, second predetermined portion 422D includes multiple user interface elements (e.g., icons, images, text etc.) associated with respective actions, which, when selected by a user, causes UI module 120 to output the touch event to another application module to perform the indicated respective action.

In the example of FIG. 4B, the user interface elements include phone icon 424B, navigation icon 424C, and go-to icon 424D. Phone icon 424B is associated with an action of opening a phone application and calling Sandwich Place (i.e., the establishment associated with the search result). Navigation icon 424C is associated with an action of opening a navigation or maps application and retrieving directions to Sandwich Place (i.e., the establishment associated with the search result). Go-to icon 424D is associated with an action of opening a new application related to the search result displayed in card-based user interface element 420C, such as a search application or a website from which the information in the search result was retrieved.

In response to receiving, from PSD 112, a touch event, UI module 120 or keyboard module 122 may determine selection of one of icons 424B-424D in the second predetermined portion 422D, and may transmit an indication of the selection of the one of icons 424B-424D to the associated application, which may perform the action associated with the selected one of icons 424B-424D. In this way, in addition to allowing insertion of information related to the search result into the application for which graphical keyboard 416B is being used to input text, keyboard module 122 may present a user with shortcuts to actions performed by other applications.

In some examples, computing device 110 may retrieve more than one search result in response to a search query. Keyboard module 122 may generate a respective card-based user interface element for each respective search result of the one or more search results. In some examples, keyboard module 122 may cause search results region 418D to display more than one search result (e.g., more than one card-based user interface element 420C). For example, as shown in FIG. 4B, keyboard module 122 may cause search results region 418D to display first card-based user interface element 420C and a portion of a second card-based user interface element 420D. The display of the portion of second card-based user interface element 420D may visually indicate to a user of computing device 110 that additional search results exist and may be viewed by navigating to the second card-based user interface element 420D. For example, keyboard module 122 may cause UI module 120 to switch from card-based user interface element 420C to second card-based user interface element 420D in response to determining a user gesture based on touch events, e.g., a swipe from right to left in FIG. 4B. In this way, keyboard module 122 may enable a user to switch among search results within search results region 418D of graphical keyboard 116B. In some examples, keyboard module 122 may enable a user to switch among card-based user interface elements using swipes to different directions (e.g., right and left), and the card-based user interface elements may be conceptually arranged in a carousel.

Figure 5:
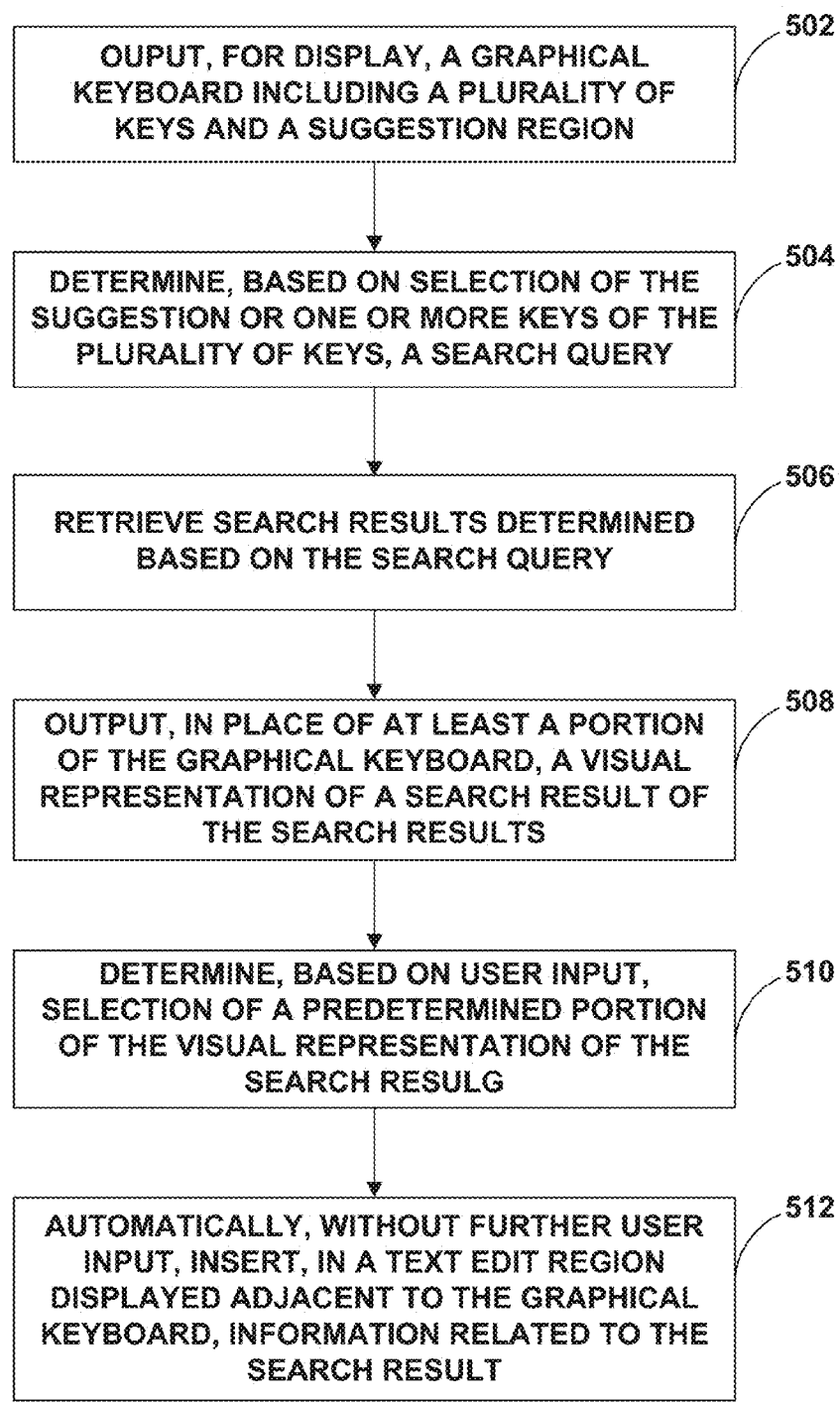
FIG. 5 is a flowchart illustrating example operations of a computing device that is configured to present a graphical keyboard with integrated search features, in accordance with one or more aspects of the present disclosure.

FIG. 5 is a flowchart illustrating example operations of a computing device that is configured to present a graphical keyboard with integrated search features, in accordance with one or more aspects of the present disclosure. The operations of FIG. 5 may be performed by one or more processors of a computing device, such as computing devices 110 of FIG. 1 or computing device 210 of FIG. 2. For purposes of illustration only, FIG. 5 is described below within the context of computing devices 110 of FIG. 1.

The technique of FIG. 5 includes outputting, by computing device 110, for display (e.g., at PSD 112), a graphical keyboard 116B comprising a plurality of keys 118A and a suggestion region 118B (502). For example, keyboard module 122 may output an indication of the graphical keyboard 116B to UI module 120, which may cause UI module 120 to control PSD 112 to output a graphical user interface including graphical keyboard 116B. Graphical keyboard 116B may include a search element 118C in addition to plurality of keys 118A and suggestion region 118B.

The technique of FIG. 5 also includes determining, by computing device 110, based on a selection of suggestion region 118B or one or more keys from the plurality of keys 118A, a search query (504). In some examples, keyboard module 122 may cause suggestion region 118B to display a predicted or suggested search query. For example, keyboard module 122 may analyze a previous entry (e.g., message or sentence) made by a user using graphical keyboard 116B and determine a predicted or suggested search query based on the previous entry. Keyboard module 122 then may output an indication of the predicted or suggested search query to UI module 120, which may cause UI module 120 to control PSD 112 to output a graphical user interface including the predicted or suggested search query in suggestion region 118B.

Alternatively, keyboard module 122 may receive, from UI module 120, an indication of a touch event at PSD 112 selecting search element 116C. In response, keyboard module 122 may output an message to UI module 120 that causes UI module 120 to control PSD 112 to output a graphical user interface in which suggestion region 118B displays text entered by the user (made by selecting keys of plurality of graphical keys 118A) as a search query.

Keyboard module 122 may receive from UI module 120 an indication of a touch event indicating selection of a search query (e.g., the predicted or suggested search query in suggestion region 118B or the search query entered by user in suggestion region 118B), and may determine the search query based on this user input (touch event).

The technique of FIG. 5 may further include retrieving, by computing device 110, one or more search results determined based on the search query (506). In some examples, retrieving, by computing device 110, one or more search results determined based on the search query (506) may include performing, by computing device 110, a search based on the search query. In some examples, retrieving, by computing device 110, one or more search results determined based on the search query (506) may include transmitting, by computing device 110, the search query to a data service, and receiving, by computing device 110, from the data service, one or more search results based on the search query.

Further, the technique of FIG. 5 includes outputting, by computing device 110, in place of at least a portion of graphical keyboard 116B, a visual representation of a search result of the one or more search results (508). For example, keyboard module 122 may output an indication of a visual representation of the one or more search results that include one or more card-based user interface element, each card-based user interface element being associated with a respective search result of the one or more search results. Keyboard module 122 may output an indication of the visual representation to UI module 120, which causes UI module 120 to cause PSD to display a user interface in which the visual representation is displayed in place at least a portion of graphical keyboard 116B, such as in place of at least one of graphical keys 118A (e.g., in place of all of graphical keys 118A).

In some examples, the technique of FIG. 5 optionally includes determining, by computing device 110, based on user input (e.g., at PSD 112), selection of a predetermined portion of the visual representation of the search result (510). For example, keyboard module 122 may receive, from UI module 120, an indication of user input (e.g., a touch event) selecting a first portion of the visual representation of the search result. The first portion of the visual representation of the search result may include content of the search result, such as, for example, text, an image, an icon, a video, or the like. The technique of FIG. 5 also optionally may include automatically, without further user input, inserting, by computing device 110, in a text edit region 116C displayed adjacent to graphical keyboard 116B, information related to the search result (512). The information related to the search result may include, for example, text, an image, an icon, a video, or the like. In some examples, the information related to the search result may be substantially similar to the information represented in the first portion of the visual representation of the search result, although formatting of the information may be different when inserted in the text edit region 116C than when displayed as part of the first predetermined portion of the visual representation of the search result.

In this way, the techniques of the disclosure may enable a computing device 110 to provide a graphical keyboard 116B with integrated search features that include display of a visual representation of at least a portion of one or more search results in place of at least a portion of the graphical keyboard 116B. Further, in some examples, the visual representation may include a card-based user interface element, and computing device 110 may be configured to output different card-based user interface elements, corresponding to different search results determined based on the search query, in response to receiving an indication of a user input, such as a swipe gesture. Additionally, computing device 110 may be configured to determine, based on user input, selection of a predetermined portion of the visual representation of the at least a portion (e.g., a search result) of the one or more search results and, automatically, without further user input, insert, in text edit region 116C displayed adjacent to graphical keyboard 116B, information related to the at least a portion (e.g., a search result) of the one or more search results.

In this way, computing device 110 may facilitate insertion of information from the search result in the application for which graphical keyboard 116B is providing input. Further, by inserting the information from the search result in text edit region 116C with a single user input, computing device 110 may allow the user to input information with fewer inputs than a typical, multi-gesture copy and paste action. In this way, computing device 110 may facilitate information retrieval using a search query and insertion of the retrieved information in an application without application switching and with few user inputs.

The following numbered clauses may illustrate one or more aspects of the disclosure:

Clause 1. A method comprising: outputting, by a computing device, for display, a graphical keyboard comprising a plurality of keys and a suggestion region; determining, by the computing device, based on a selection of the suggestion region or one or more keys from the plurality of keys, a search query; retrieving, by the computing device, one or more search results determined based on the search query; and outputting, by the computing device, in place of at least a portion of the graphical keyboard, a visual representation of a particular search result of the one or more search results.

Clause 2. The method of clause 1, retrieving one or more search results determined based on the search query comprises: transmitting, by the computing device and to a data service, the search query; and receiving, by the computing device, from the data service, one or more search results determined based on the search query.

Clause 3. The method of clause 1, wherein retrieving one or more search results determined based on the search query comprises performing, by the computing device, a search based on the search query to determine the one or more search results.

Clause 4. The method of clause 1, further comprising: determining, by the computing device, based on user input, selection of a predetermined portion of the visual representation of the particular search result; and automatically, without further user input, inserting, by the computing device, in a text edit region displayed adjacent to the graphical keyboard, information related to the particular search result.

Clause 5. The method of clause 4, wherein the predetermined portion comprises a first predetermined portion and the user input comprises a first user input, further comprising: determining, by the computing device, based on a second user input, selection of a second predetermined portion of the visual representation of the particular search result; and automatically, without further user input, performing, by the computing device, a predetermined action associated with the second predetermined portion.

Clause 6. The method of any one of clauses 1 to 5, wherein: the particular search result comprises a first particular search result; the visual representation comprises a first visual representation; and the first visual representation comprises a first card-based user interface elements; the method further comprising: receiving, by the computing device, an indication of a swipe user input gesture; and responsive to receiving the indication of the swipe user input gesture, outputting, by the computing device, for display, an animation switching from the first card-based user interface element to a second card-based user interface element that is a second visual representation of a second particular search result of the one or more search results, wherein each of the first card-based user interface element and the second card-based user interface element are displayed in place of at least a portion of the graphical keyboard.

Clause 7. The method of any one of clauses 1 to 6, wherein outputting the visual representation of the particular search result in place of at least a portion of the graphical keyboard comprising outputting a visual representation of the particular search result that replaces at least some keys of the plurality of keys.

Clause 8. The method of clause 4 or 5, wherein inserting, in the text edit region displayed adjacent to the graphical keyboard, the information related to the particular search result of the at least a portion of the one or more search results comprises inserting, in the text edit region displayed adjacent to the graphical keyboard, a natural language response to the search query.

Clause 9. A computing device comprising: a presence-sensitive display; at least one processor; and a memory storing instructions that, when executed by the at least one processor, cause the at least one processor to: output, for display at the presence-sensitive display, a graphical keyboard comprising a plurality of keys and a suggestion region; determine, based on a selection of the suggestion region or one or more keys from the plurality of keys, a search query; retrieve one or more search results determined based on the search query; and output, in place of at least a portion of the graphical keyboard, a visual representation of a particular search result of the one or more search results.

Clause 10. The computing device of clause 9, wherein the instructions that, when executed by the at least one processor, cause the at least one processor to retrieve the one or more search results determined based on the search query cause the at least one processor to: transmit, to a data service, the search query; and receive, from the data service, one or more search results determined based on the search query.

Clause 11. The computing device of claim 9, wherein the instructions that, when executed by the at least one processor, cause the at least one processor to retrieve the one or more search results determined based on the search query cause the at least one processor to perform a search based on the search query to determine the one or more search results.

Clause 12. The computing device of clause 9, wherein the memory further comprises instructions that, when executed by the at least one processor, cause the at least one processor to: determine, based on user input, selection of a predetermined portion of the visual representation of the particular search result; and automatically, without further user input, insert, in a text edit region displayed adjacent to the graphical keyboard, information related to the particular search result.

Clause 13. The computing device of clause 12, wherein: the predetermined portion comprises a first predetermined portion and the user input comprises a first user input; and the memory further comprises instructions that, when executed by the at least one processor, cause the at least one processor to: determine, based on a second user input, selection of a second predetermined portion of the visual representation of the particular search result; and automatically, without further user input, perform a predetermined action associated with the second predetermined portion.

Clause 14. The computing device of any one of clauses 9 to 13, wherein: the particular search result comprises a first particular search result; the visual representation comprises a first visual representation; the first visual representation comprises a first card-based user interface elements; and the memory further comprises instructions that, when executed by the at least one processor, cause the at least one processor to: receive, from the presence-sensitive display, an indication of a swipe user input gesture; and responsive to receiving the indication of the swipe user input gesture, output, for display at the presence-sensitive display, an animation switching from the first card-based user interface element to a second card-based user interface element that is a second visual representation of a second particular search result of the one or more search results, wherein each of the first card-based user interface element and the second card-based user interface element are displayed in place of at least a portion of the graphical keyboard.

Clause 15. The computing device of any one of clauses 9 to 14, wherein the visual representation of the particular search result replaces at least some keys of the plurality of keys.

Clause 16. The computing device of clause 12 or 13, wherein the information related to the particular search result comprises a natural language response to the search query.

Clause 17. A computer-readable storage medium encoded with instructions that, when executed by at least one processor of a computing device, cause the at least one processor to: output, for display at a presence-sensitive display, a graphical keyboard comprising a plurality of keys and a suggestion region; determine, based on a selection of the suggestion region or one or more keys from the plurality of keys, a search query; retrieve one or more search results determined based on the search query; and output, in place of at least a portion of the graphical keyboard, a visual representation of a particular search result of the one or more search results.

Clause 18. The computer-readable storage medium of clause 17, further comprising instructions that, when executed by the at least one processor, cause the at least one processor to: determine, based on user input, selection of a predetermined portion of the visual representation of the particular search result; and automatically, without further user input, insert, in a text edit region displayed adjacent to the graphical keyboard, information related to the particular search result.

Clause 19. The computer-readable storage medium of clause 17 or 18, wherein: the predetermined portion comprises a first predetermined portion and the user input comprises a first user input; and the memory further comprises instructions that, when executed by the at least one processor, cause the at least one processor to: determine, based on a second user input, selection of a second predetermined portion of the visual representation of the particular search result; and automatically, without further user input, perform a predetermined action associated with the second predetermined portion.

Clause 20. The computer-readable storage medium of any one of clauses 17 to 19, wherein: the particular search result comprises a first particular search result; the visual representation comprises a first visual representation; the first visual representation comprises a first card-based user interface elements; and further comprising instructions that, when executed by the at least one processor, cause the at least one processor to: receive, from the presence-sensitive display, an indication of a swipe user input gesture; and responsive to receiving the indication of the swipe user input gesture, output, for display at the presence-sensitive display, an animation switching from the first card-based user interface element to a second card-based user interface element that is a second visual representation of a second particular search result of the one or more search results, wherein each of the first card-based user interface element and the second card-based user interface element are displayed in place of at least a portion of the graphical keyboard.

Clause 21. The computer-readable storage medium of any one of clauses 17 to 20, wherein the visual representation of the particular search result replaces at least some keys of the plurality of keys.

Clause 22. The computer-readable storage medium of any one of clauses 18 to 21, wherein the information related to the particular search result comprises a natural language response to the search query.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a keyboard application executing at a computing device, for display at a presence-sensitive display, as part of a user interface of a different application executing at the computing device, a graphical keyboard comprising: a search element selectable to transition the keyboard application to search mode, a plurality of keys, and a word suggestion region configured to display predicted search queries with a predetermined text color, font, or font size, to visually differentiate the predicted search queries from predicted characters, words, or phrases, other than the predicted search queries, that are displayed in the word suggestion region;
   determining, by the keyboard application, based on a selection of one or more keys from the plurality of keys, a search query;
   retrieving, by the keyboard application, search results determined based on the search query;
   outputting, by the keyboard application, in place of some keys of the plurality of keys, a first visual representation of a carousel of card-based user interface elements while continuing to display the search element and the word suggestion region, wherein:
   each card-based user interface element in the carousel is a graphical representation of a particular search result from the search results determined based on the search query; and the first visual representation of the carousel includes a first card-based user interface element associated with a first search result from the search results and a portion of a second card-based user interface element associated with a second search result from the search results, the second card-based user interface element associated with the second search result being different than the first card-based user interface element associated with the first search result;

determining, by the keyboard application, based on first user input detected at a location of the presence-sensitive display at which the first visual representation of the search results is displayed, selection of the first card-based user interface element;

automatically, without further user input and while continuing to display the search element, the word suggestion region, and the carousel, inserting, by the keyboard application, in a text edit region displayed adjacent to the graphical keyboard, a hyperlink to a website containing more information related to the first search result that the first card-based user interface element graphically represents; and after outputting the first visual representation of the search results, and in response to receiving an indication of a swipe user input gesture as a second user input, outputting, by the keyboard application, in place of the first visual representation of the carousel, a second visual representation of the carousel including an animation switching focus from the first card-based user interface element to the second card-based user interface element, wherein the second visual representation of the carousel includes:

a portion of the first card-based user interface element;
the second card-based user interface element; and
a portion of a third card-based user interface element associated with a third search result from the search results.

2. The method of claim 1, wherein retrieving the search results determined based on the search query comprises performing, by the keyboard application, a search based on the search query to determine the search results.

3. The method of claim 1, further comprising:
determining, by the keyboard application, based on a third user input, selection of a predetermined portion of the first card-based user interface element in the carousel; and
automatically, without detecting further user input, performing, by the keyboard application, a predetermined action associated with the predetermined portion,
wherein the third user input is different than the first and second user inputs.

4. A computing device comprising:
a presence-sensitive display;
at least one processor; and
a memory storing instructions that, when executed by the at least one processor, cause the at least one processor to execute a keyboard application to:
output, for display at the presence-sensitive display as part of a user interface of a different application executing at the at least one processor, a graphical keyboard comprising: a search element selectable to transition the keyboard application to search mode, a plurality of keys, and a word suggestion region configured to display predicted search queries with a predetermined text color, font, or font size, to visually differentiate the predicted search queries from predicted characters, words, or phrases, other than the predicted search queries, that are displayed in the word suggestion region;

determine, based on a selection of the one or more keys from the plurality of keys, a search query;
retrieve one or more search results determined based on the search query;
output, in place of some of the keys of the plurality of keys, a first visual representation of a carousel of card-based user interface elements while continuing to display the search element and the word suggestion region, wherein:
each card-based user interface element in the carousel is a graphical representation of a particular search result from the search results determined based on the search query; and
the first visual representation of the carousel includes a first card-based user interface element associated with a first search result from the search results and a portion of a second card-based user interface element associated with a second search result from the search results, the second card-based user interface element associated with the second search result being different than the first card-based user interface element associated with the first search result;
determine, based on first user input detected at a location of the presence-sensitive display at which the first visual representation of the search results is displayed, selection of the first card-based user interface element;
automatically, without further user input and while continuing to display the search element, the word suggestion region, and the carousel, insert, in a text edit region displayed adjacent to the graphical keyboard, a hyperlink to a website containing more information related to the first search result that the first card-based user interface element graphically represents; and
after outputting the first visual representation of the search results, and in response to receiving an indication of a swipe user input gesture as a second user input, output, in place of the first visual representation of the carousel, a second visual representation of the carousel including an animation switching focus from the first card-based user interface element to the second card-based user interface element, wherein the second visual representation of the carousel includes:
a portion of the first card-based user interface element;
the second card-based user interface element; and
a portion of a third card-based user interface element associated with a third search result from the search results.

5. The computing device of claim 4, wherein the instructions that, when executed by the at least one processor, cause the at least one processor to execute the keyboard application to retrieve the search results determined based on the search query and cause the at least one processor to perform a search based on the search query to determine the search results.

6. The computing device of claim 4, wherein the memory further comprises instructions that, when executed by the at least one processor, cause the at least one processor to execute the keyboard application to:
determine, based on a third user input, selection of a predetermined portion of the first card-based user interface element in the carousel; and
automatically, without detecting further user input, perform a predetermined action associated with the predetermined portion, wherein the third user input is different than the first and second user inputs.

7. A non-transitory computer-readable storage medium encoded with instructions that, when executed by at least one processor of a computing device, cause the at least one processor to execute a keyboard application to:
output, for display at a presence-sensitive display, as part of a user interface of a different application executing at the at least one processor, a graphical keyboard comprising: a search element selectable to transition the keyboard application to search mode, a plurality of keys, and a word suggestion region configured to display predicted search queries with a predetermined text color, font, or font size, to visually differentiate the predicted search queries from predicted characters, words, or phrases, other than the predicted search queries, that are displayed in the word suggestion region;
determine, based on a selection of the one or more keys from the plurality of keys, a search query;
retrieve one or more search results determined based on the search query;
output, in place of some of the keys of the plurality of keys, a first visual representation of a carousel of card-based user interface elements while continuing to display the search element and the word suggestion region, wherein:
each card-based user interface element in the carousel is a graphical representation of a particular search result from the search results determined based on the search query; and
the first visual representation of the carousel includes a first card-based user interface element associated with a first search result from the search results and a portion of a second card-based user interface element associated with a second search result from the search results, the second card-based user interface element associated with the second search result being different than the first card-based user interface element associated with the first search result;
determine, based on first user input detected at a location of the presence-sensitive display at which the first visual representation of the search results is displayed, selection of a the first card-based user interface element;
automatically, without further user input and while continuing to display the search element, the word suggestion region, and the carousel, insert, in a text edit region displayed adjacent to the graphical keyboard, a hyperlink to a website containing more information related to the first search result that the first card-based user interface element graphically represents; and
after outputting the first visual representation of the search results, and in response to receiving an indication of a swipe user input gesture as a second user input, output, in place of the first visual representation of the carousel, a second visual representation of the carousel including an animation switching focus from the first card-based user interface element to the second card-based user interface element, wherein the second visual representation of the carousel includes:
a portion of the first card-based user interface element;
the second card-based user interface element; and
a portion of a third card-based user interface element associated with a third search result from the search results.

8. The method of claim 1, wherein the keyboard application is a stand-alone application that is invoked by the different application or other applications executing at the computing device when the different application or the other applications require graphical keyboard input functionality.

9. The method of claim 1, wherein the keyboard application is a stand-alone application that is invoked by the different application when the different application requires graphical keyboard input functionality.

10. The method of claim 1, wherein retrieving the search results determined based on the search query comprises:
transmitting, by the keyboard application, to a data service configured to perform searches, the search query; and
receiving, by the keyboard application, from the data service, the search results.

* * * * *